(12) United States Patent
Jeun

(10) Patent No.: US 7,496,194 B2
(45) Date of Patent: Feb. 24, 2009

(54) SLIDING AND SWING APPARATUS FOR A PORTABLE APPARATUS

(75) Inventor: Young-Mok Jeun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 711 days.

(21) Appl. No.: 11/120,252

(22) Filed: May 2, 2005

(65) Prior Publication Data

US 2006/0060737 A1 Mar. 23, 2006

(30) Foreign Application Priority Data

Sep. 17, 2004 (KR) ...................... 10-2004-0074544

(51) Int. Cl.
*H04M 1/00* (2006.01)
*H04M 9/00* (2006.01)
(52) U.S. Cl. ............................ 379/433.11; 379/433.12; 379/433.13; 455/575.1
(58) Field of Classification Search ............ 379/433.01, 379/433.11, 433.12, 433.13; 455/575.1, 455/575.3, 575.4, 90.3; 16/367, 334
See application file for complete search history.

(56) References Cited

U.S. PATENT DOCUMENTS

| 7,146,195 B2 * | 12/2006 | Sudo et al. ............... 455/575.1 |
| 2005/0107137 A1 * | 5/2005 | Byun et al. .............. 455/575.1 |

FOREIGN PATENT DOCUMENTS

| CN | 2805313 | 8/2006 |
| EP | 1 357 726 | 10/2003 |

* cited by examiner

*Primary Examiner*—Curtis Kuntz
*Assistant Examiner*—Tuan D Nguyen
(74) *Attorney, Agent, or Firm*—The Farrell Law Firm, PC

(57) ABSTRACT

A sliding swing apparatus for a mobile terminal is disclosed that provides a swing movement after a complete sliding movement. A sliding member is adapted to slide along the longitudinal direction and then to rotate once sliding movement is fully extended. A sliding movement means enables the sliding member to slide, a swing member is adapted to rotate together with the sliding member. A third guide means guides the rotation of the swing member via a rotation means. A swing locking apparatus stops rotation, by bringing the swing member and the third guide means into contact and then allows for rotation.

25 Claims, 22 Drawing Sheets

SLIDING AND SWING APPARATUS FOR A PORTABLE APPARATUS

PRIORITY

This application claims priority to an application entitled "Sliding Swing Apparatus for Portable Apparatus" filed with the Korean Intellectual Property Office on Sep. 17, 2004 and assigned Ser. No. 2004-74544, the contents of which are hereby incorporated by reference.

BACKGROUND OF THE INVENTION

1. Field of the Invention

The present invention relates to digital portable apparatuses including cellular phones, PDAs (personal digital assistants), HHPs (hand held phones), MP3 phones, game phones, camera phones, Internet phones, and communication apparatuses combining them, and more particularly to a sliding swing apparatus for a portable apparatus adapted to perform a sliding motion in combination with a swing motion so that displayed information can be watched conveniently.

2. Description of the Related Art

In general, a "portable communication apparatus" refers to an electronic apparatus a user can carry to perform wireless communication. In consideration of portability, designs of such portable communication apparatuses have tended not only toward compactness, slimness, and lightness, but also toward multimedia availability to provide a wider variety of functions. In particular, future portable communication apparatuses are expected to incorporate greater multi-functionality and multi-purpose utilization, as well as greater compactness and lightness, but also will be modified to be suitable for various multimedia environments or Internet environments. Additionally, such portable communication apparatuses are now commonly used by people of all ages and all walks of life throughout the world and are recognized by some people as a nearly indispensable commodity which must be carried all the time.

Conventional portable communication apparatuses may be classified into various categories according to their appearance, such as bar-type portable communication apparatuses, flip-type portable communication apparatuses, and folder-type portable communication apparatuses. In addition, portable communication apparatuses may be classified into neck wearable type communication apparatuses and wrist wearable type communication apparatuses according to the position at or the way in which a user puts on the communication apparatuses. Furthermore, portable communication apparatuses may be classified into swing-type communication apparatuses and sliding-type communication apparatuses according to ways of opening and closing the communication apparatuses. These variously classified portable communication apparatuses can be easily understood by those skilled in the art.

Meanwhile, conventional portable communication apparatuses now tend to have a function of transmitting data at a high speed in addition to the basic function of performing voice communication. In other words, because of the increase in demand by consumers, portable communication apparatuses now tend to provide a service using a wireless communication technology capable of transmitting data at a high speed.

According to the current trends, conventional portable communication apparatuses are equipped with a camera lens to transmit video signals. Portable communication apparatuses generally have an external or embedded camera lens module to perform video communication with a desired partner or to take pictures of a desired object.

However, conventional sliding-type portable communication apparatuses, such as those disclosed in Korean Patent Application No. 2002-71911 filed in the name of the present applicant (the contents of which are hereby incorporated by reference), have a problem in that they are inconvenient to use because the housing is adapted to slide only in one direction from the main body and only one display device is fixedly mounted on the housing.

As such, conventional portable communication apparatuses are inconvenient for watching videos or TVs through the display device. This is because such content requires a larger display screen. Accordingly, there is a need for a portable apparatus capable of performing a sliding motion in combination with a swing motion and a sliding swing apparatus for the same.

SUMMARY OF THE INVENTION

Accordingly, the present invention has been made to solve the above-mentioned problems occurring in the prior art, and an object of the present invention is to provide a sliding swing apparatus having a sliding function in combination with a swing function for use in a sliding swing type portable apparatus.

Another object of the present invention is to provide a sliding swing apparatus adapted to easily implement a swing movement after a complete sliding movement.

Still another object of the present invention is to provide a sliding swing apparatus which is compact.

Yet another object of the present invention is to provide a sliding swing locking apparatus capable of making a smooth sliding movement in a TV or video watching mode and a swing movement together with the sliding movement.

In order to accomplish this object, there is provided a sliding swing apparatus of a portable apparatus having a main body and a sliding housing adapted to be opened and closed through sliding and swing motions while facing the main housing, and the sliding swing apparatus includes a sliding member adapted to slide along a longitudinal direction and to rotate; first and second guide means positioned on the sliding member to guide the sliding movement of the sliding member; a sliding movement means positioned between the sliding member and the guide means to enable the sliding member to slide from initial to final positions; a swing member adapted to be coupled to the sliding member by the guide means for a sliding movement and to rotate together with the sliding member only after the sliding movement is over; a third guide means coupled to the swing member to guide the rotation of the sliding member and the swing member; a rotation means positioned on the third guide means to enable the swing member to rotate; and a swing locking apparatus adapted to cause the swing member and the third guide means to engage each other and stop rotating, during a linear sliding movement together with the sliding member, and to cause the swing member to disengage from the third guide means to be able to rotate, when the sliding movement is over or fully extended.

In accordance with another aspect of the present invention, there is provided a sliding swing apparatus of a portable apparatus having a main body and a sliding housing adapted to be opened and closed through sliding and swinging motions while facing the main housing, and the sliding swing apparatus includes a sliding member adapted to slide along the longitudinal direction and to rotate; a guide means for guiding the sliding movement and rotation of the sliding member; a sliding movement means positioned between the sliding member and the guide means to enable the sliding member to slide from initial to final positions; a swing member adapted to be coupled to the sliding member by the guide means for a linear sliding movement and to rotate together with the sliding member only after the sliding movement is over; and a rotation means positioned on the guide means to enable the swing member to rotate.

In accordance with still another aspect of the present invention, there is provided a sliding swing apparatus of a portable apparatus having a main body and a sliding housing adapted to be opened and closed through sliding and swing motions while facing the main housing, and the sliding swing apparatus includes a sliding member adapted to slide along the longitudinal direction and to rotate by means of a guide; a swing member adapted to be coupled to the sliding member by the guide for a linear sliding movement and to rotate together with the sliding member only after the sliding movement is over; and a sliding movement/rotation means for enabling the sliding member to slide from initial to final positions and enabling the members to rotate in the final position.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

Figure 1:
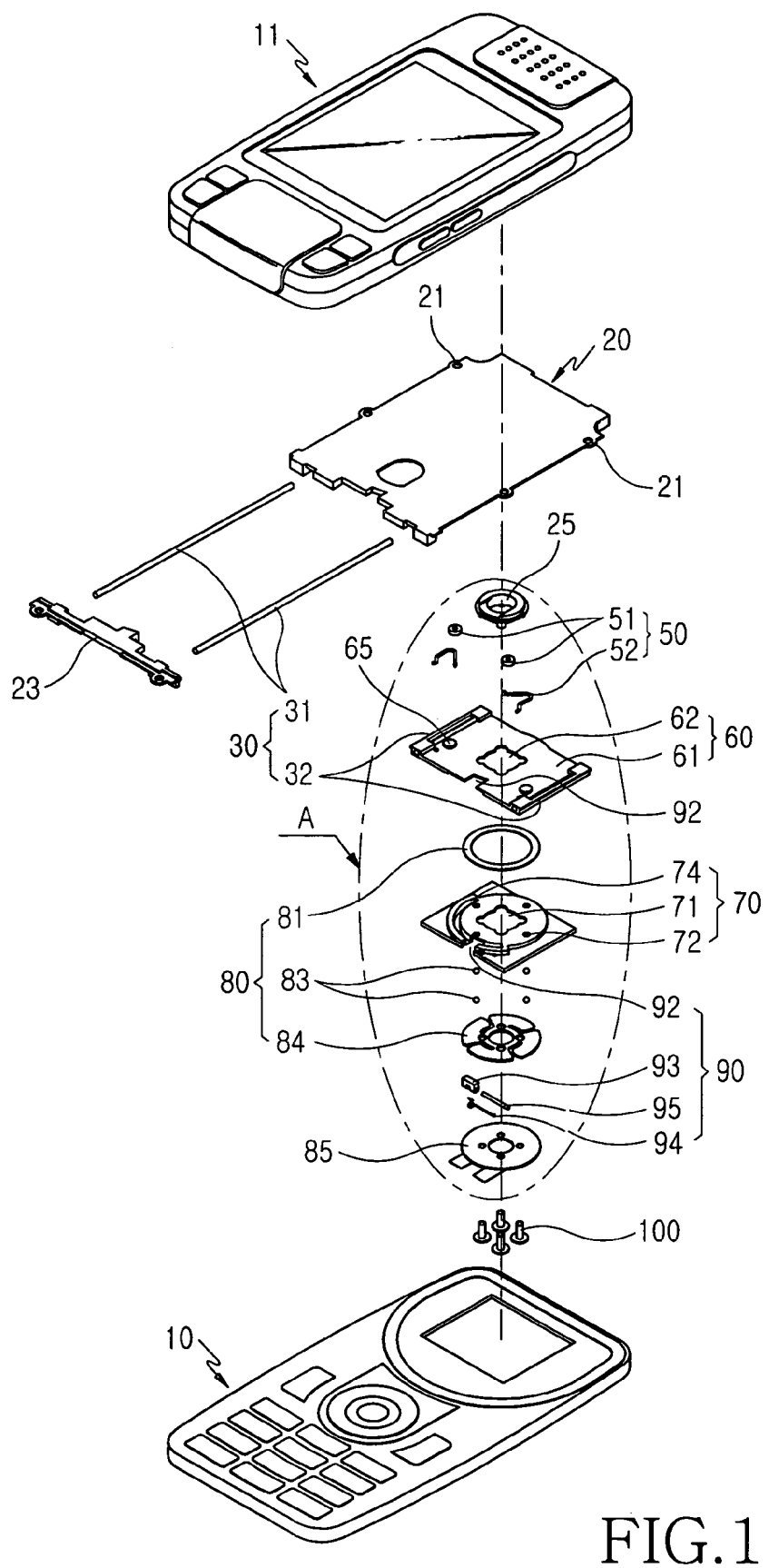
FIG. 1 is an exploded perspective view illustrating the construction of a sliding swing apparatus according to a preferred embodiment of the present invention.
Figure 2:
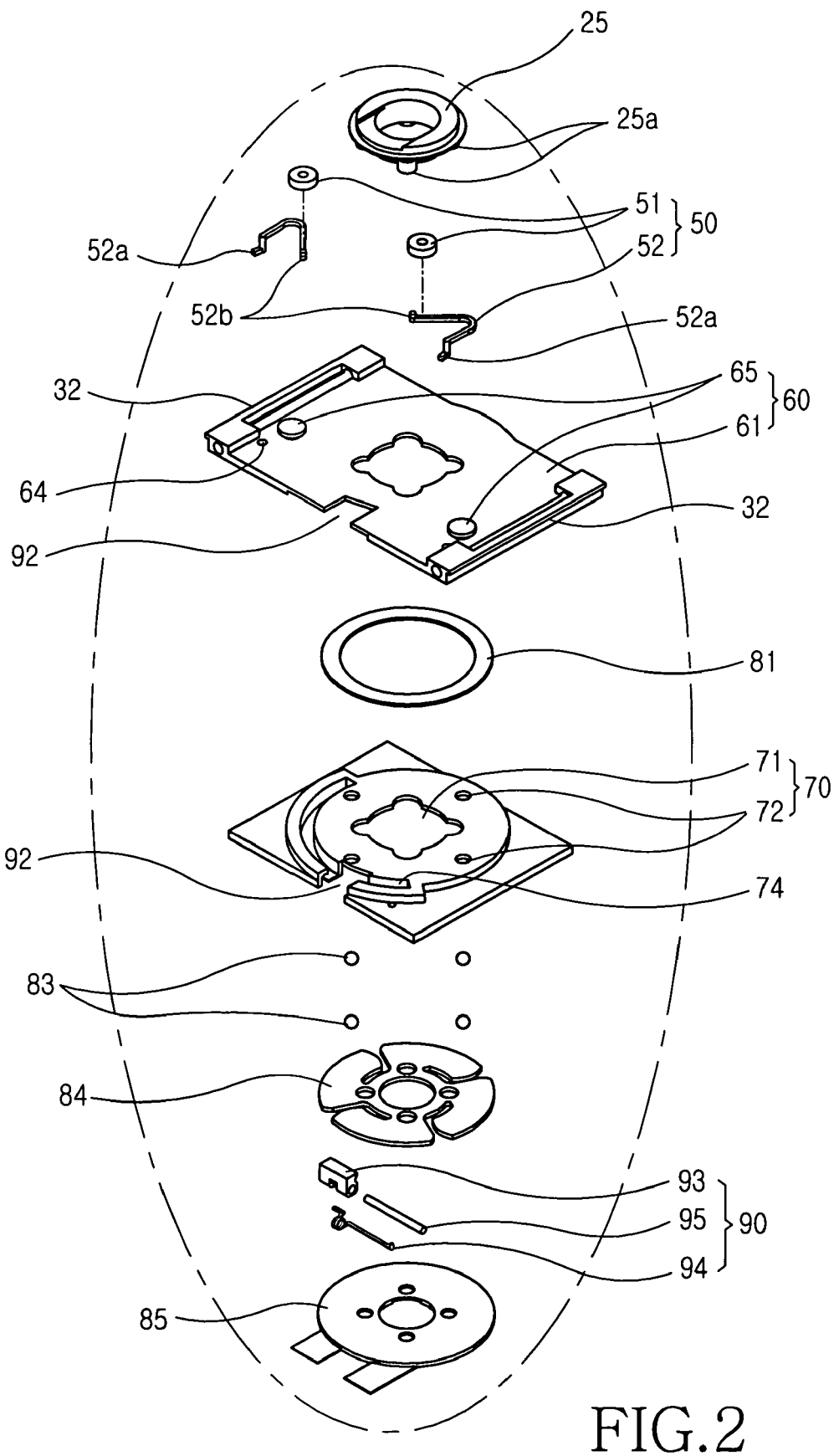
FIG. 2 is an exploded perspective view magnifying part A of FIG. 1.
Figure 3:
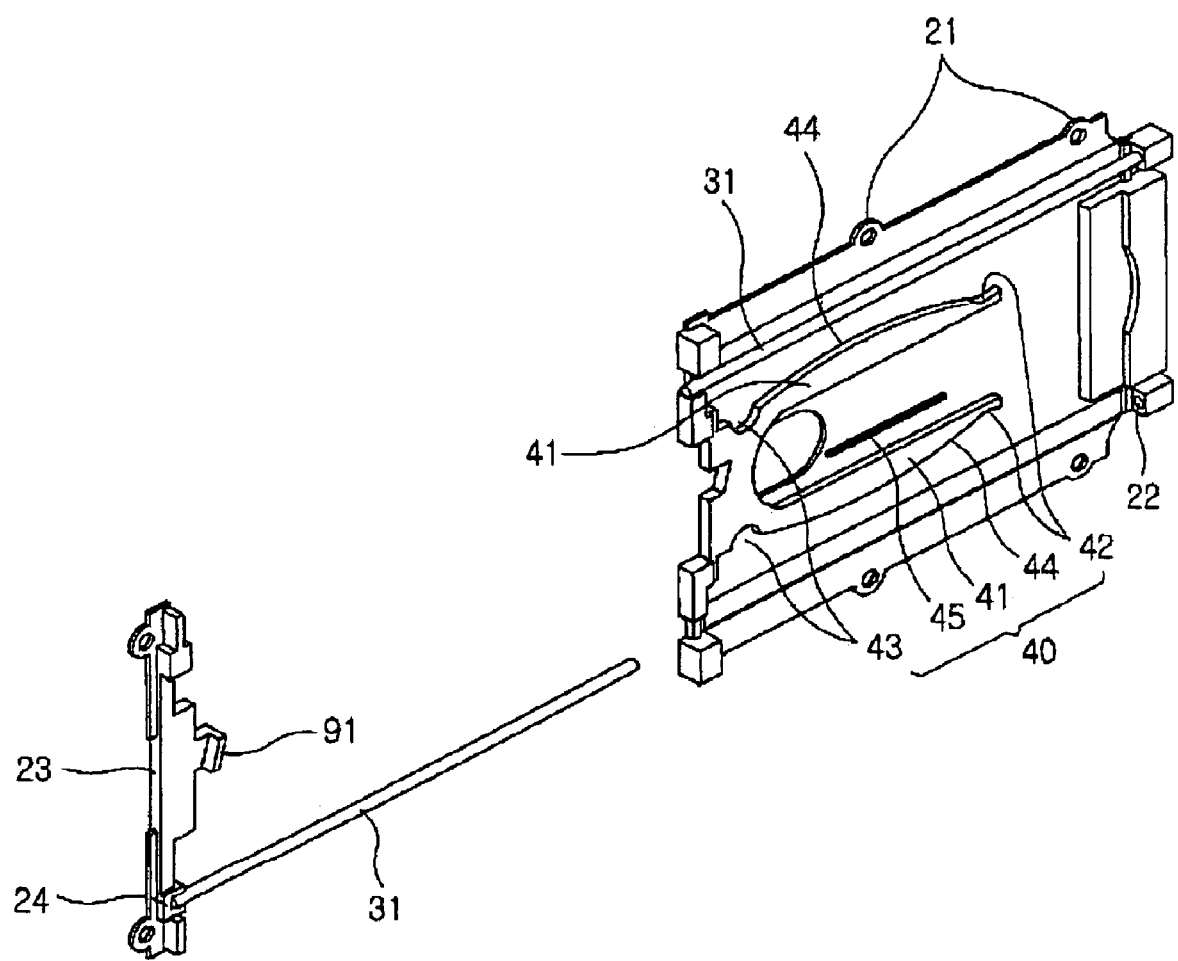
FIG. 3 is a perspective view illustrating a sliding member of a sliding swing apparatus according to a preferred embodiment of the present invention.

As shown in FIGS. 1-3, a sliding swing apparatus of a portable terminal includes a main body 10; a sliding housing 11; a sliding member 20; first, second, and third means 30, 40, and 70; a sliding movement means 50; a swing member 60; a rotation means 80; and a swing locking apparatus 90.

The first guide means 30 is positioned on both lateral surfaces of the sliding member 20 and the second guide means 40 is formed on the interior of the sliding member 20 so that the sliding member 20 can slide along the longitudinal direction.

The sliding member 20 is coupled to the swing member 60 in such a manner that it can slide along the longitudinal direction thereof and can rotate. The sliding movement means 50 is positioned between the sliding member 20 and the first and second guide means 30 and 40 so that the sliding member 20 can slide from initial to final positions.

The swing member 60 is positioned on the upper surface of the sliding member 20 and is adapted to rotate together with the sliding member 20 only after the linear sliding movement of the sliding member 20 guided by the first and second guide means 30 and 40 is fully extended. The third guide means 70 is positioned below the swing member 60 to guide the rotation of the sliding member 20 and the swing member 60. The rotation means 80 is positioned above and below the third guide means 70 to enable the swing member 60 to rotate.

The swing locking apparatus 90 is positioned on a lateral surface of the swing member 60 and the third guide means 70 and is adapted to cause the swing member 60 to engage with the third guide means 70, during a linear sliding movement of the sliding member 20, for stopping rotation and to cause the swing member 60 to disengage from the third guide means 70, after the sliding is over, to enable rotation.

As shown in FIGS. 2 and 3, the first guide means 30 includes a pair of guide rods 31 and a pair of fastening portions 32. The pair of guide rods 31 are fixed to both lateral surfaces of the sliding member 20, respectively, so that the sliding member 20 can slide along the longitudinal direction. The pair of fastening portions 32 are positioned on both ends of the swing member 60, respectively, so that they can extend along the pair of guide rods 31 to be coupled thereto for a sliding movement.

Figure 4:
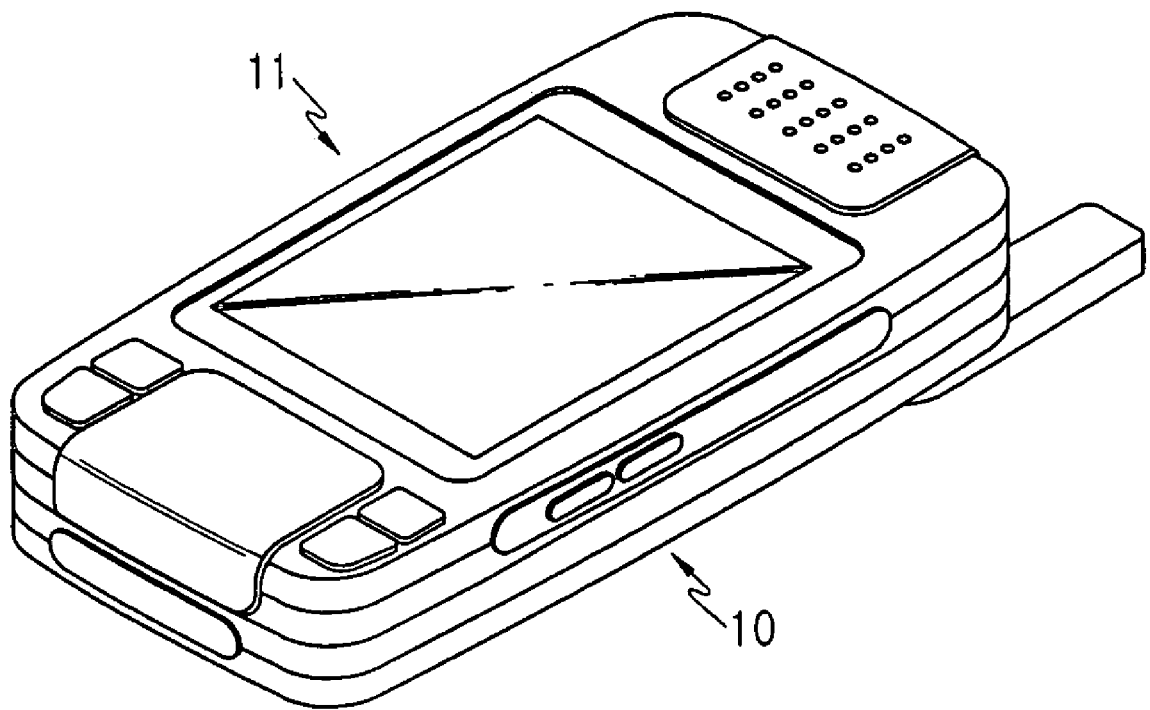
FIG. 4 illustrates a main body and a sliding housing, prior to a sliding movement, of a sliding swing apparatus according to a preferred embodiment of the present invention.

As shown in FIGS. 3 and 4, the sliding member 20 has a member-side fastening portion 21 formed thereon to be fastened and fixed to the sliding housing 11, a pair of fixation holes 22 formed on an end thereof to be coupled and fixed to an end of the guide rod 31, respectively, and a support rib 23 fastened to the other end thereof, which has a pair of second fixation holes 24 to be coupled to the other end of the guide rod 31, respectively.

Figure 5:
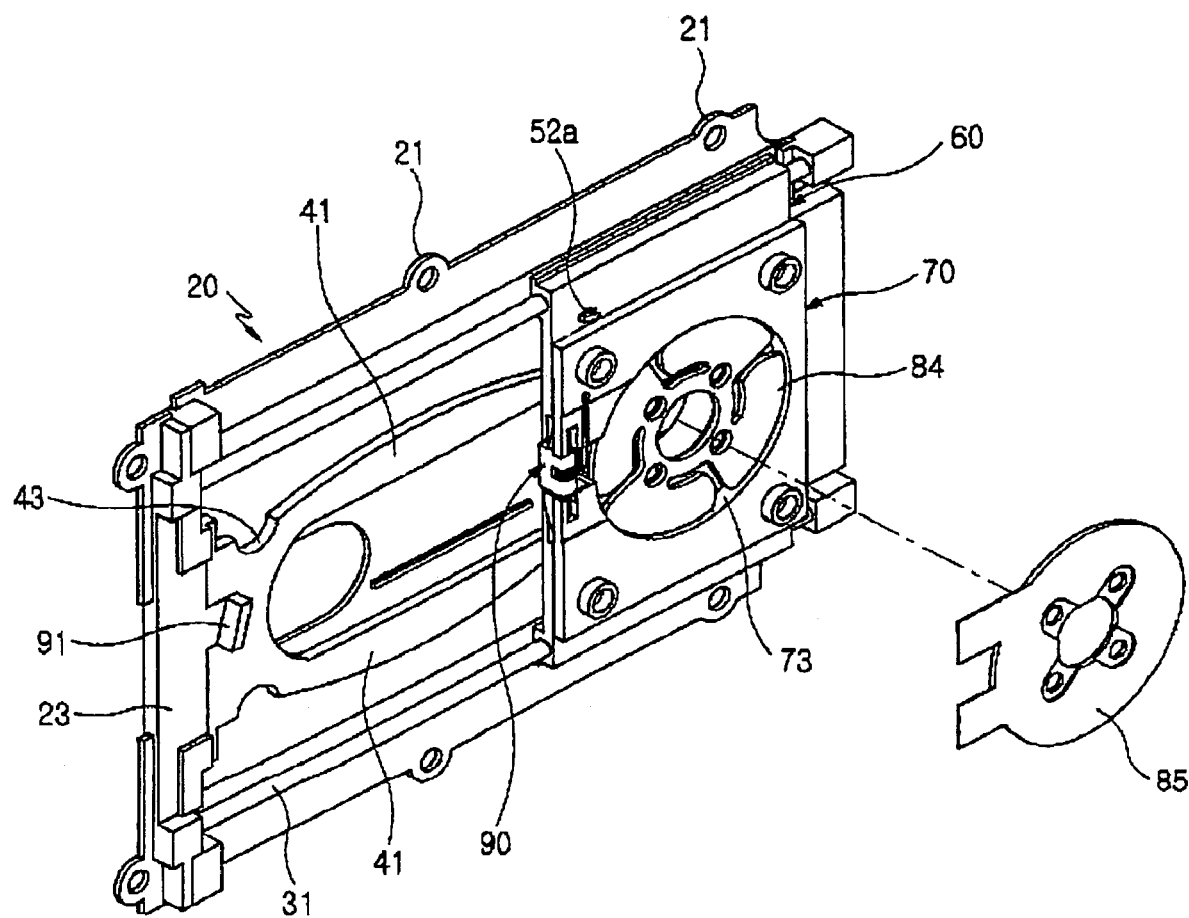
FIG. 5 is a perspective view illustrating a sliding swing apparatus, prior to a sliding movement, according to a preferred embodiment of the present invention.

As shown in FIGS. 3 and 5, the second guide means 40 includes a guide rail 41, a first stop groove 42, a second stop groove 43, and a guide slant surface 44. The guide rail 41 is formed on the interior of the sliding member 20 to guide the sliding movement of the sliding member 20. The first stop groove 42 is formed on an end of the guide rail 41 to determine the initial position of the sliding member 20. The second stop groove 43 is formed on the other end of the guide rail 41 to determine the final position of the sliding member 20. The guide slant surface 44 is curved in a direction perpendicular to the sliding direction near the center between the first and second stop grooves 42 and 43.

Figure 6:
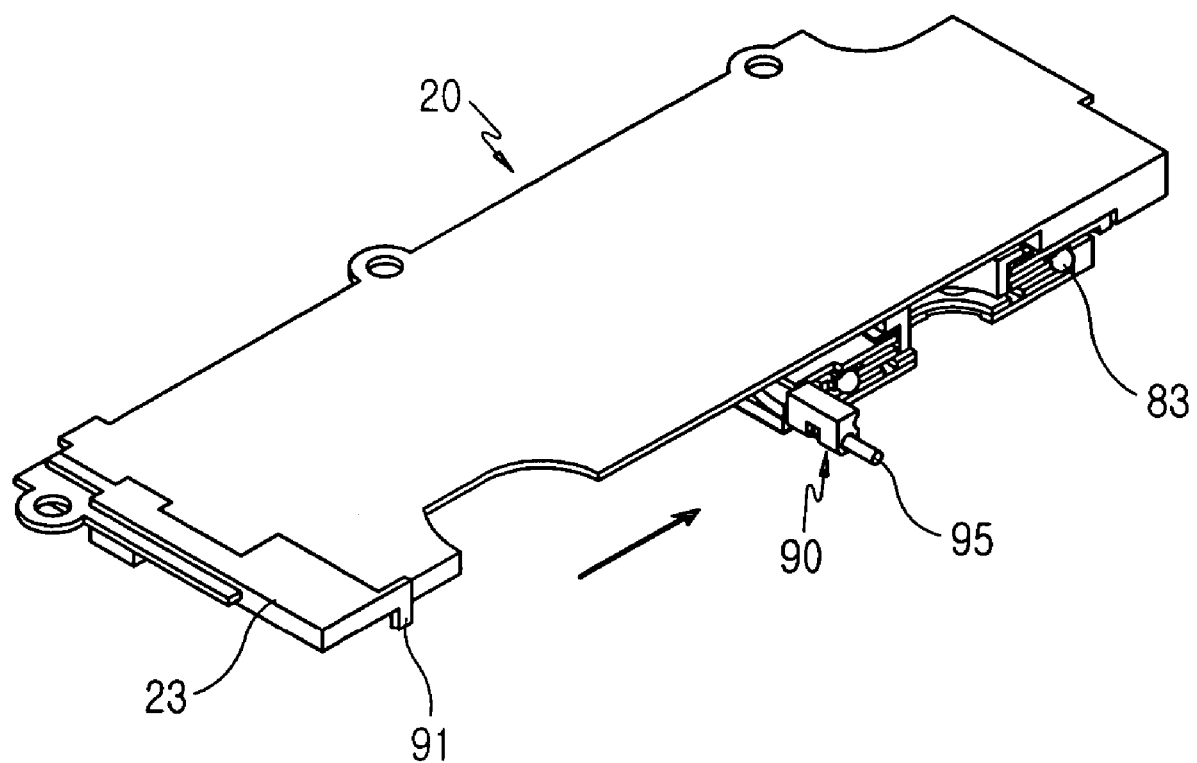
FIG. 6 is a perspective view taken along the longitudinal direction of FIG. 5.
Figure 19:
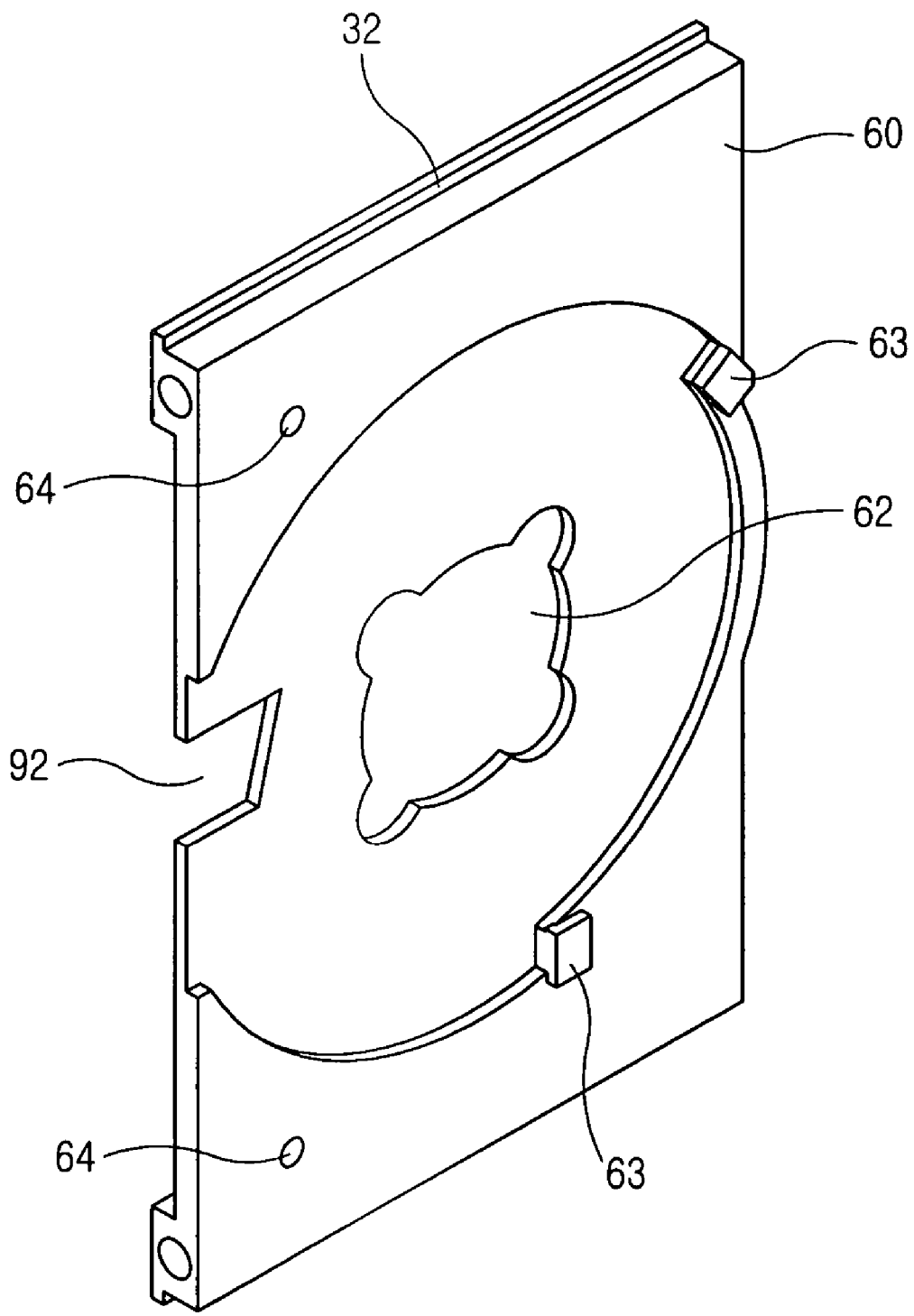
FIG. 19 is a perspective view illustrating the lower surface of a swing member of a sliding swing apparatus according to a preferred embodiment of the present invention.

As shown in FIGS. 1, 5, and 6, the swing member 60 has a reception space 61 recessed from the upper surface thereof to incorporate the sliding movement means 50, a through-hole 62 formed at the center thereof so that a flexible circuit (not shown) can pass though to electrically connect the main body 10 and the sliding housing to each other, and at least one latching step 63 formed on the lower surface thereof as shown in FIG. 19, which is adapted to contact first and second stopper portions 74a and 74b (described later) to limit the rotation of the swing member 60.

As shown in FIGS. 1, 2, 7, 8 to 10, and 15, the sliding movement means 50 includes at least one rolling member 51 and an elastic means 52. The rolling member 51 is positioned between the sliding member 20 and the swing member 60 and is adapted to roll as it slides while continuously being forced against the guide slant surface 44 of the second guide means 40. The elastic means 52 is coupled to the sliding member 20 and to the rolling member 51 to push the rolling member 51 against the guide slant surface 44. The elastic means is made up of a torsion spring 52, which has a fixation end 52a formed on an end thereof to be coupled and fixed to a fixation hole 64 formed on the swing member 60 and a free end 52b formed on the other end thereof to be coupled to the rolling member 51 and to be guided along the guide slant surface 44 of the second guide means 40. The center portion of the torsion spring 52 is fixed to a spring fixation portion 65 formed on the swing member 60 to rotate the free end 52b along a predetermined trajectory according to the sliding movement.

As shown in FIGS. 1, 2, 9, 17, and 18, the third guide means 70 may be a fixation member 70 to be attached by screws 100 to the main body 10. The fixation member 70 has a member-side through-hole 71 formed at the center thereof so that the flexible circuit can pass through, at least one ball hole 72 formed about the member-side through-hole 71 with an equiangular spacing along the circumferential direction so that a corresponding ball 83 can be seated therein, and a reception groove 73 recessed from the lower surface of the fixation member 70 so that the rotation means can be received therein.

Figure 16:
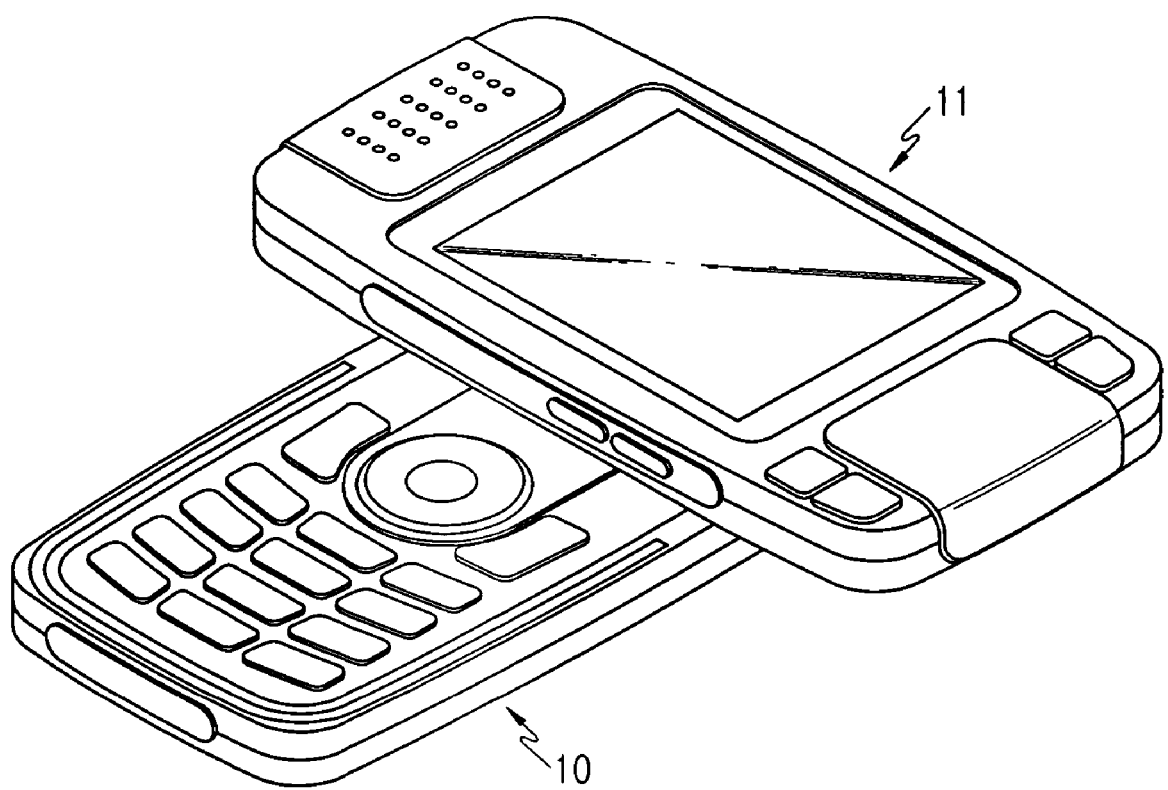
FIG. 16 illustrates a main body and a sliding housing, after a swing movement, of a sliding swing apparatus according to an embodiment of the present invention.
Figure 17:
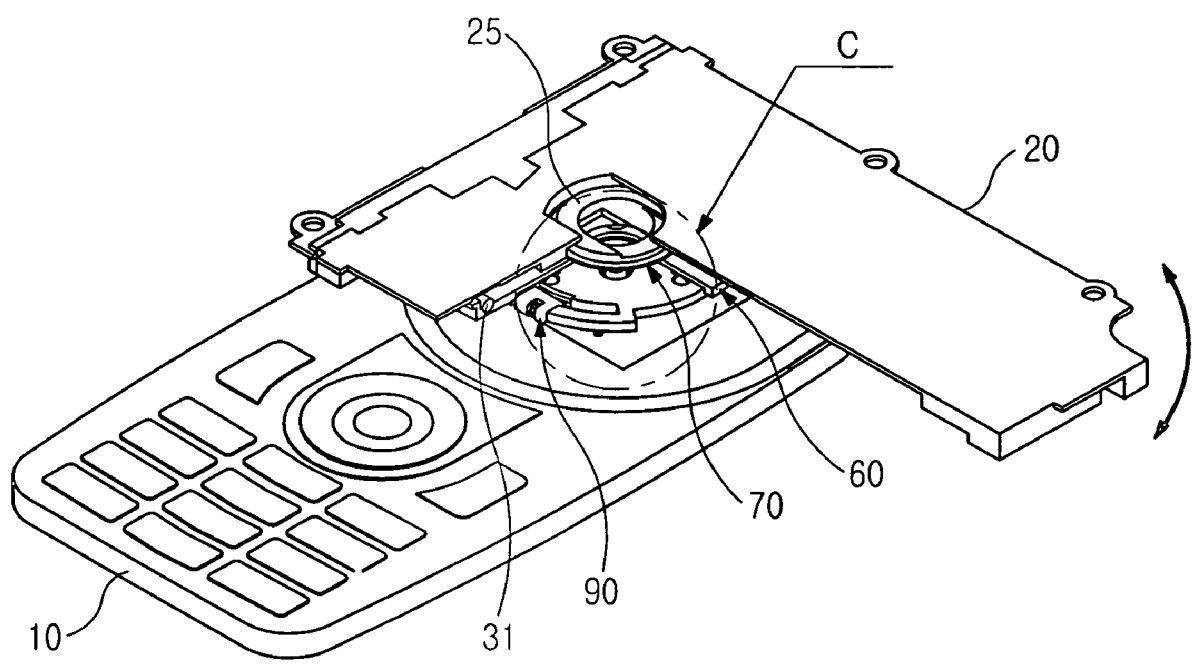
FIG. 17 is a partially broken perspective view illustrating a sliding swing apparatus, after a swing movement, of a sliding swing apparatus according to a preferred embodiment of the present invention.
Figure 18:
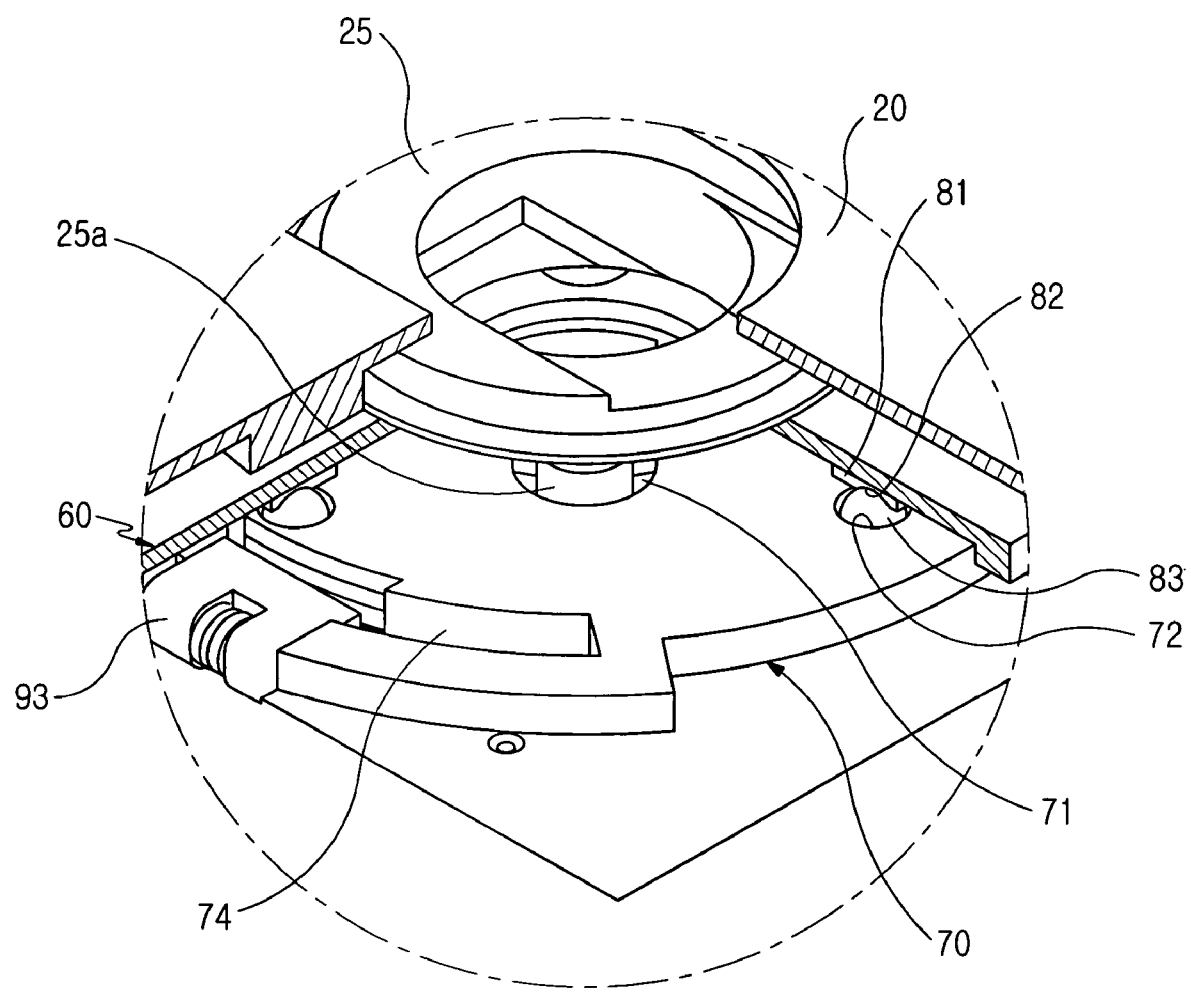
FIG. 18 is a perspective view magnifying part C of FIG. 17.

As shown in FIGS. 16 to 18, the rotation means 80 includes a ball washer 81, at least one ball groove 82, at least one ball 83, and a spring member 84. The ball washer 81 is positioned on the lower surface of the swing member 60 and is adapted to rotate together with the corresponding ball 83. The ball groove 82 is formed on the upper surface of the ball washer 81 with an equiangular spacing so that the corresponding ball 83 can be seated therein. The ball 83 extends through the ball hole 72 of the fixation member 79 in such a manner that, as the swing member 60 rotates, the ball 83 sits in the ball groove 82 while traveling along the ball groove 82. The spring member 84 is positioned on the top surface of the ball 83 and provides an elastic force that pushes the ball 83 along the groove 82. The spring member 84 has a spring cover 85 positioned on the lower surface thereof to protect the components of the rotation means 80.

As shown in FIGS. 1, 2 and 3, the sliding member 20 has a swing shaft 25 positioned on the lower surface thereof, which is adapted to slide along the second guide means 40 and which extends through the swing member 60 while being rotatably fastened thereto, in order to rotatably fasten the rotation means 80 and the third guide means 70. The swing shaft 25 has at least one screw fastening portion 25a formed thereon with an equiangular spacing for screw 100 fastening, after the swing member 60, the rotation means 80, the third guide means 70, and the spring cover 85 are successively fastened.

As shown in FIG. 3, the second guide means 40 has a guide protrusion 45 formed on the interior thereof along the longitudinal direction of the sliding member 20, in order to guide the sliding movement of the swing shaft 25.

The sliding member 20, the first, second, and third guide means 30, 40, and 70, the sliding movement means 50, the swing member 60, and the rotation means 80 are preferably made of a metallic material.

As shown in FIGS. 1, 3, 6, 9, and 11 to 14, the swing locking portion 90 includes a locker portion 91, a locker groove 92, a rotation locker 93, and an elastic means 94. The locker portion 91 is formed on the support rib 23, which is fastened to the sliding member 20, in such a manner that the locker portion 91 can be inserted into and released from the locker groove 92. The locker groove 92 is formed on a lateral surface of the swing member 60 and the third guide means 70 in such a manner that the locker portion 91 can be inserted or released according to the sliding movement of the sliding member 20. The rotation locker 93 is positioned in the locker groove 92 and is adapted to limit the rotation of the swing member 60 by causing the swing member 60 and the third guide means 70 to engage with each other, during an early stage of the sliding movement. The rotation locker 93 contacts the locker 91 as it is inserted into the locker groove 92 when the sliding movement is fully extended and rotates the locker 91 about a locker hinge axis A1, so that the swing member 60 and the third guide means 70 disengage from each other, and the swing member 60 can rotate.

The elastic means 94 is positioned between the locker groove 92 and the rotation locker 93 to provide an elastic force that rotates the rotation locker 93 in the locker groove 92.

Figure 20:
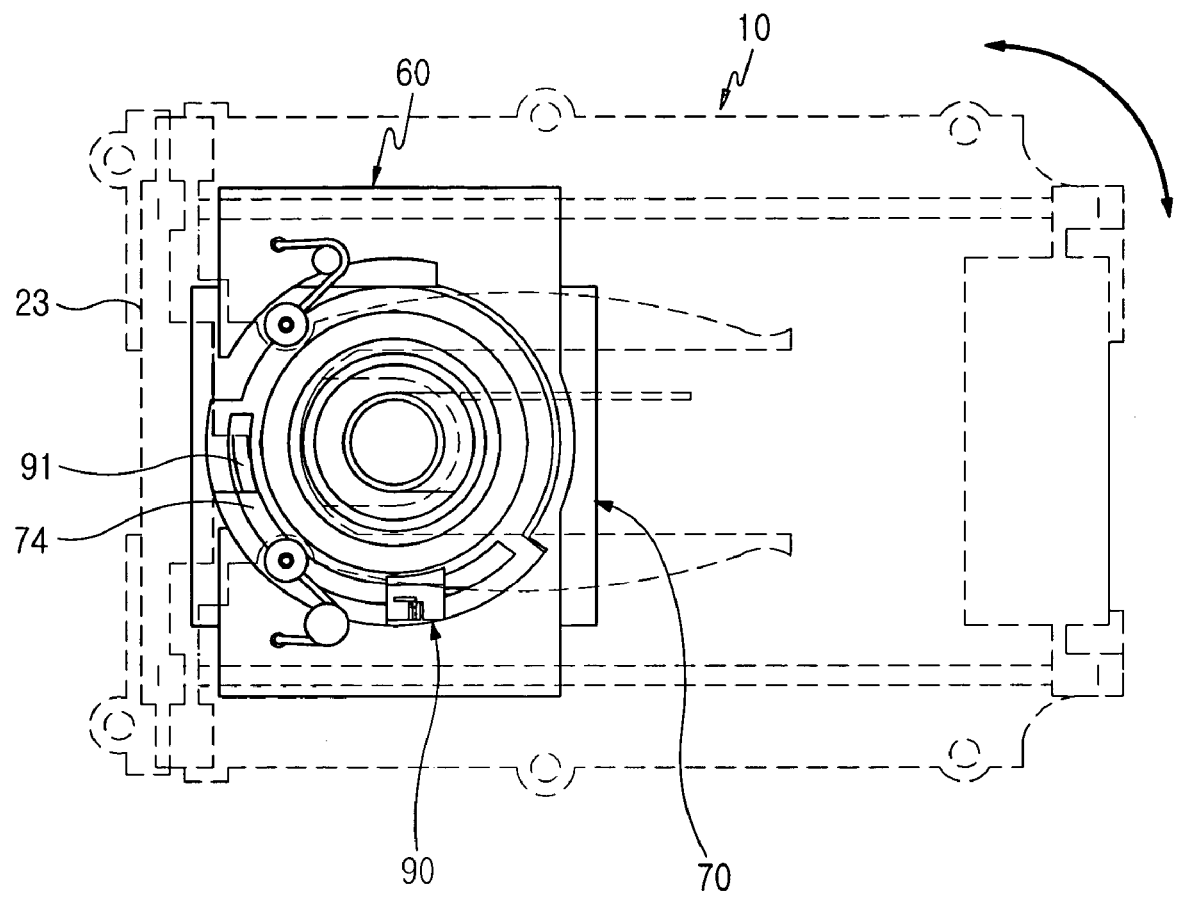
FIG. 20 is a top view illustrating a sliding swing apparatus, which has swung, according to a preferred embodiment of the present invention.
Figure 21:
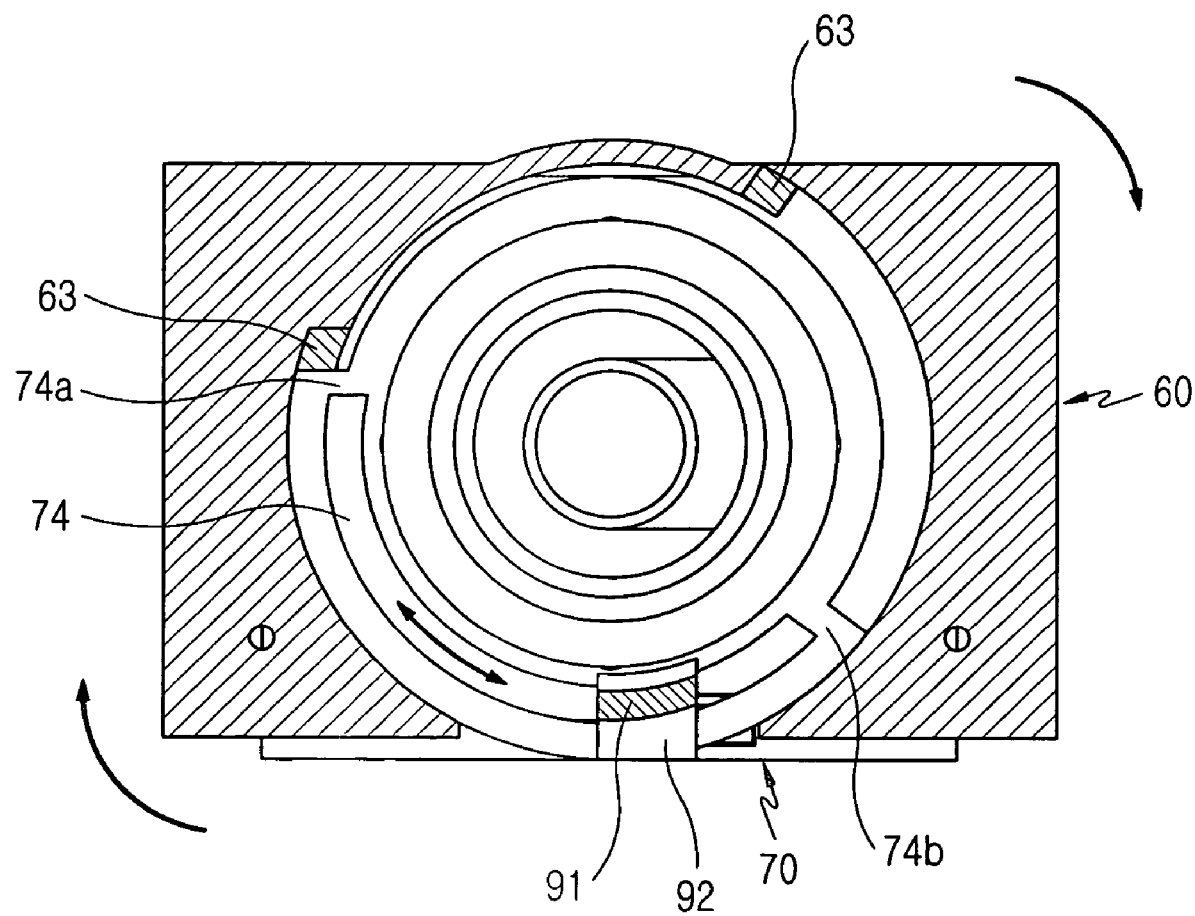
FIG. 21 is a top view illustrating a swing member, prior to a swing movement, of a sliding swing apparatus according to a preferred embodiment of the present invention.
Figure 22:
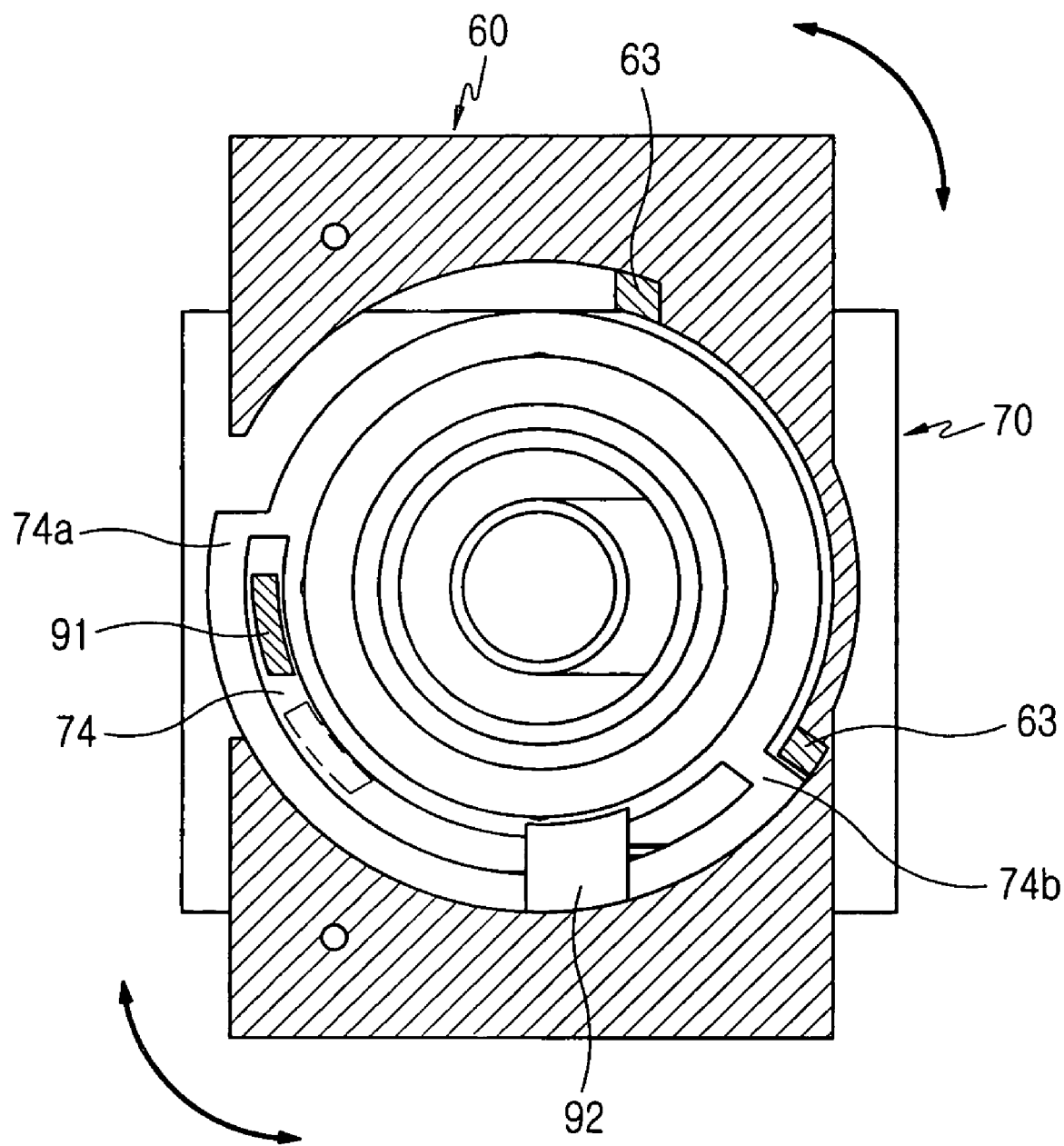
FIG. 22 is a top view illustrating a swing member, after a swing movement, of a sliding swing apparatus according to a preferred embodiment of the present invention.

As shown in FIGS. 20 to 22, the third guide means 70 has a locker guide groove 74 formed on the upper surface thereof, which is adapted to guide the locker portion 91 as the swing member 60 rotates and the rotation locker 93 is rotated by the locker portion 91. The locker guide groove 74 has first and second stopper portions 74a and 74b formed on both ends thereof, which are adapted to contact the latching step 63 of the swing member 60 and to limit the rotation of the swing member 60.

The rotation locker 93 has a locker pin 95 that extends through the locker 93 when coupled to the pin 95. The locker pin 95 provides the locker hinge axis A1 and is adapted to rotate about the hinge axis A1.

Figure 13:
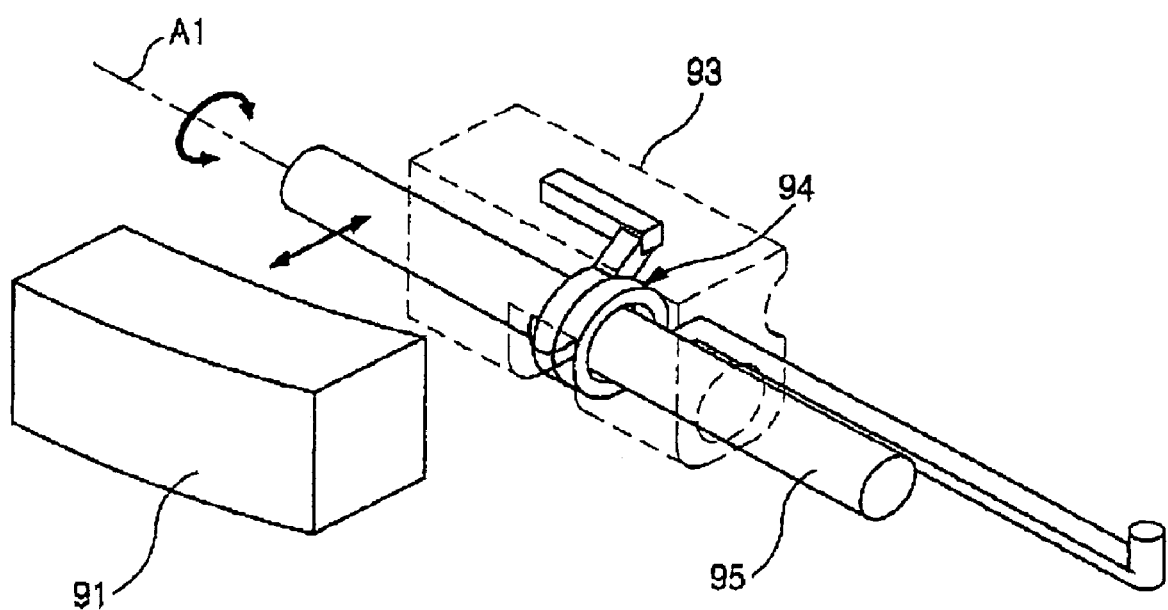
FIG. 13 is a perspective view illustrating a swing locking apparatus, prior to actuation, of a sliding swing apparatus according to a preferred embodiment of the present invention.
Figure 14:
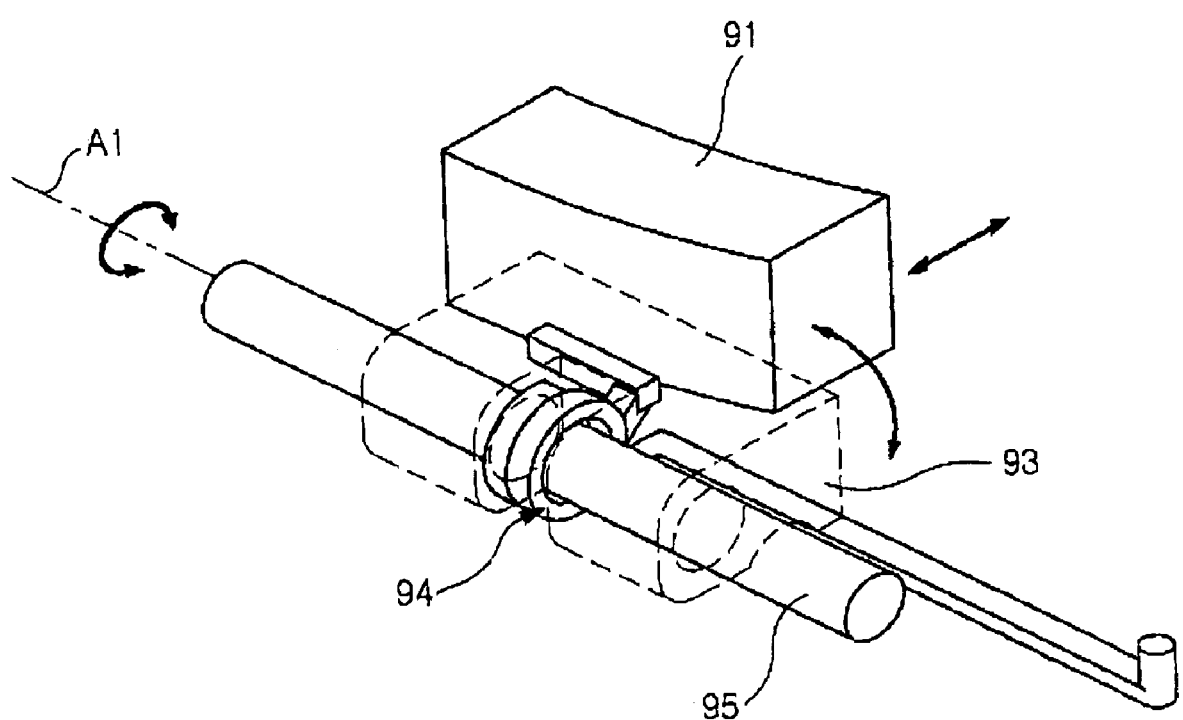
FIG. 14 is a perspective view illustrating a swing locking apparatus, after actuation, of a sliding swing apparatus according to a preferred embodiment of the present invention.

As shown in FIGS. 13 and 14, the elastic means includes a pin spring 94, an end of which is fixed to the third guide means 70 and the other end to the rotation locker 93. The center portion of the pin spring 94 extends in axial alignment with, and is coupled to the locker pin 95 to provide an elastic force for returning the rotation locker 93 to the original position after rotation. The locker pin 95 is coupled to an end of the bottom surface of the third guide means 70 to rotatably support the rotation locker 93.

The operation of the sliding swing apparatus of a portable terminal, configured as above, according to a preferred embodiment of the present invention will now be described in more detail with reference to FIGS. 1 to 22.

As shown in FIGS. 1 and 2, the sliding member 20 is fastened to the sliding housing 11 of the portable terminal by screws 100. The fixation member 70, which is the third guide means 70, is also 100 fastened to the main housing 10 by screws 100.

The fixation member 70 is rotatably coupled to the swing member 60 by the swing shaft 25.

Figure 8:
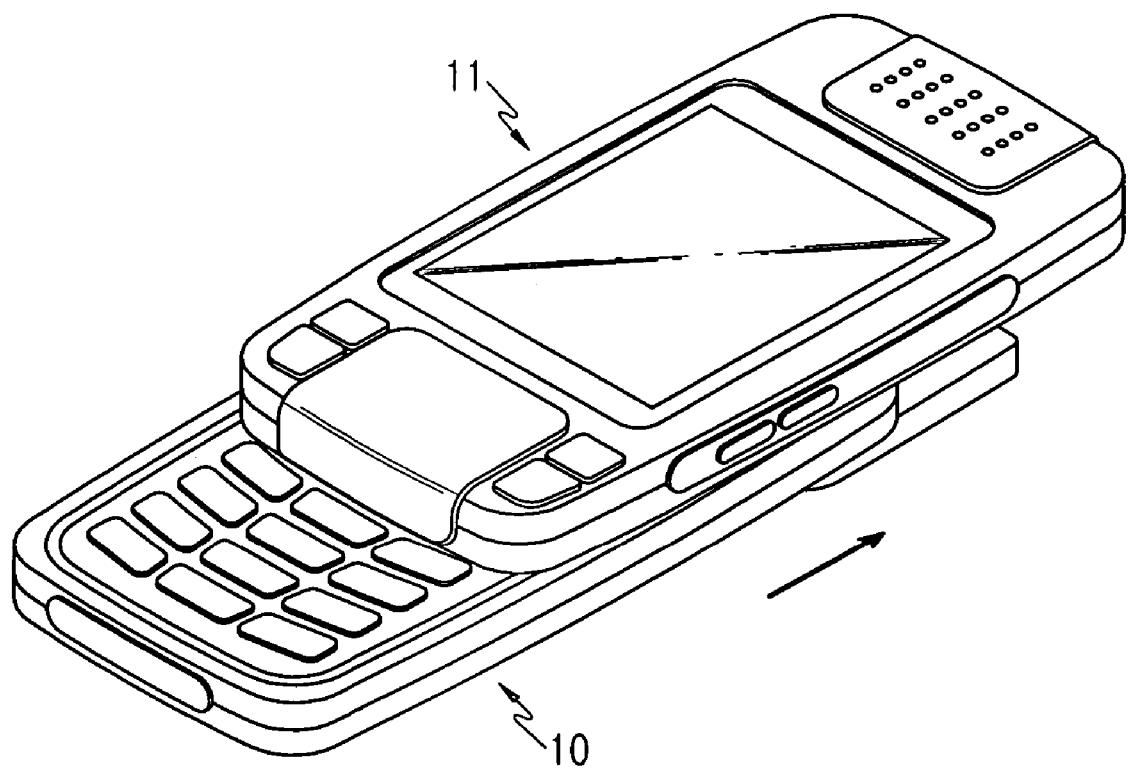
FIG. 8 illustrates a main body and a sliding housing, after a sliding movement, of a sliding swing apparatus according to a preferred embodiment of the present invention.
Figure 9:
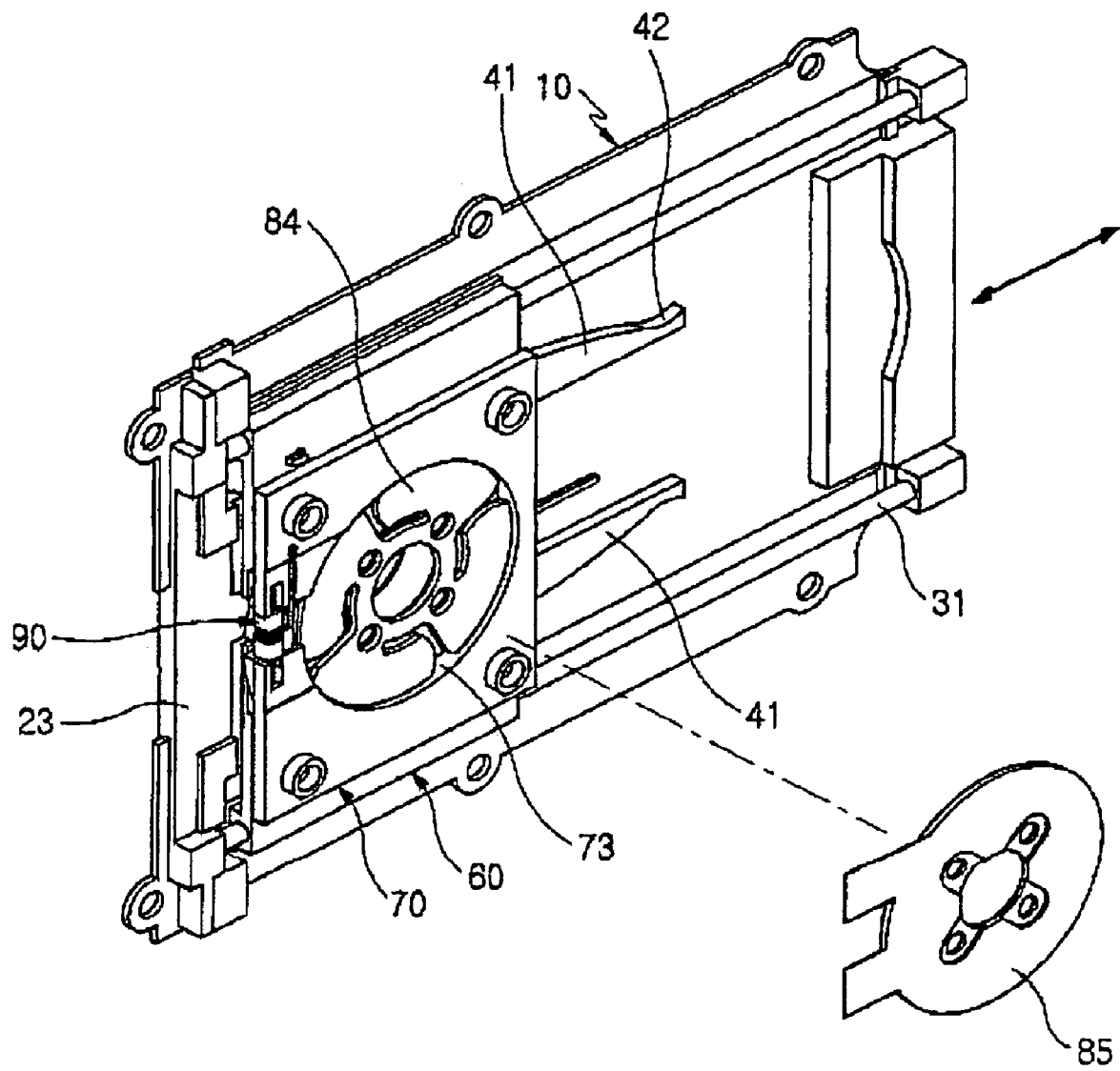
FIG. 9 is a perspective view illustrating a sliding swing apparatus, after a sliding movement, according to a preferred embodiment of the present invention.
Figure 10:
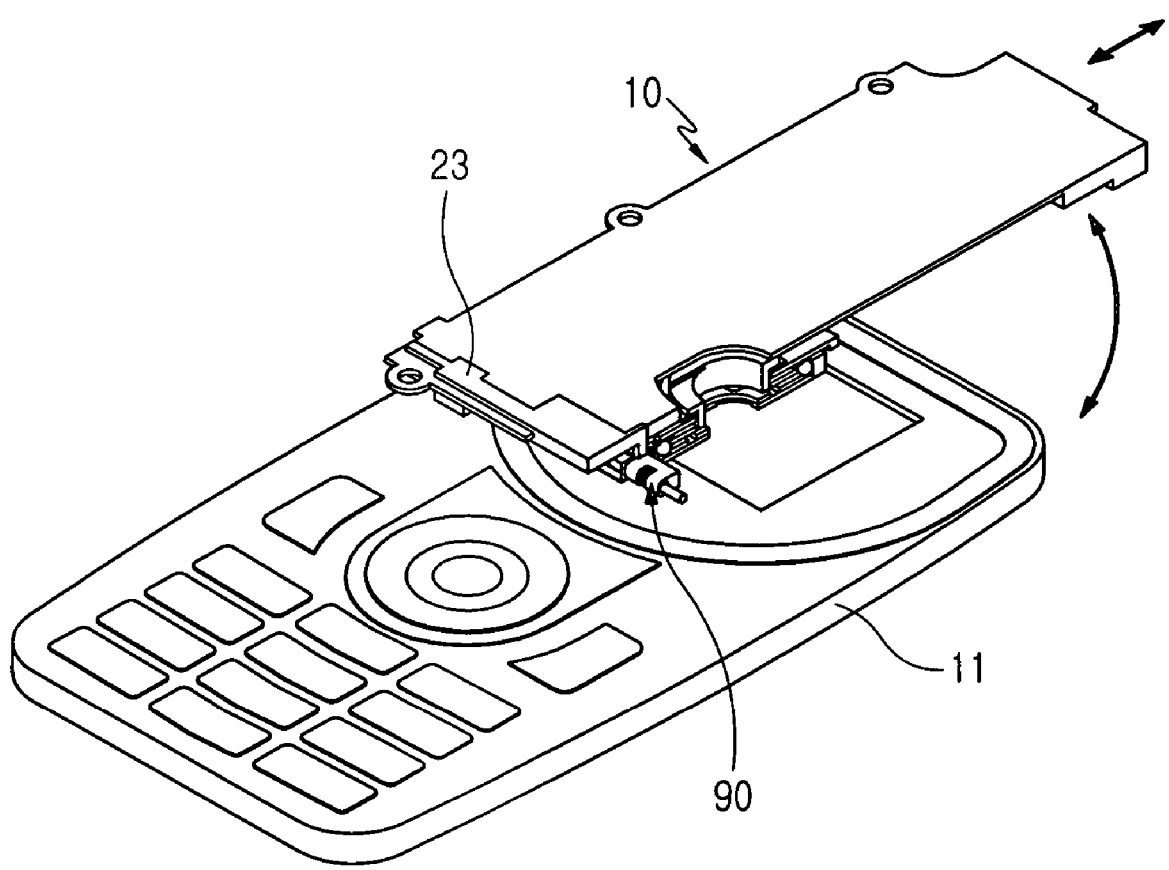
FIG. 10 is a perspective view taken along the longitudinal direction of FIG. 9.

If the sliding housing 11 is slid along the longitudinal direction as shown in FIGS. 4 and 8, the pair guide rods 31, which respectively extend through the pair of fastening portions 32 of the swing member 60 to be coupled thereto, then extend through the fastening portion 32 to provide the sliding movement.

Figure 7:
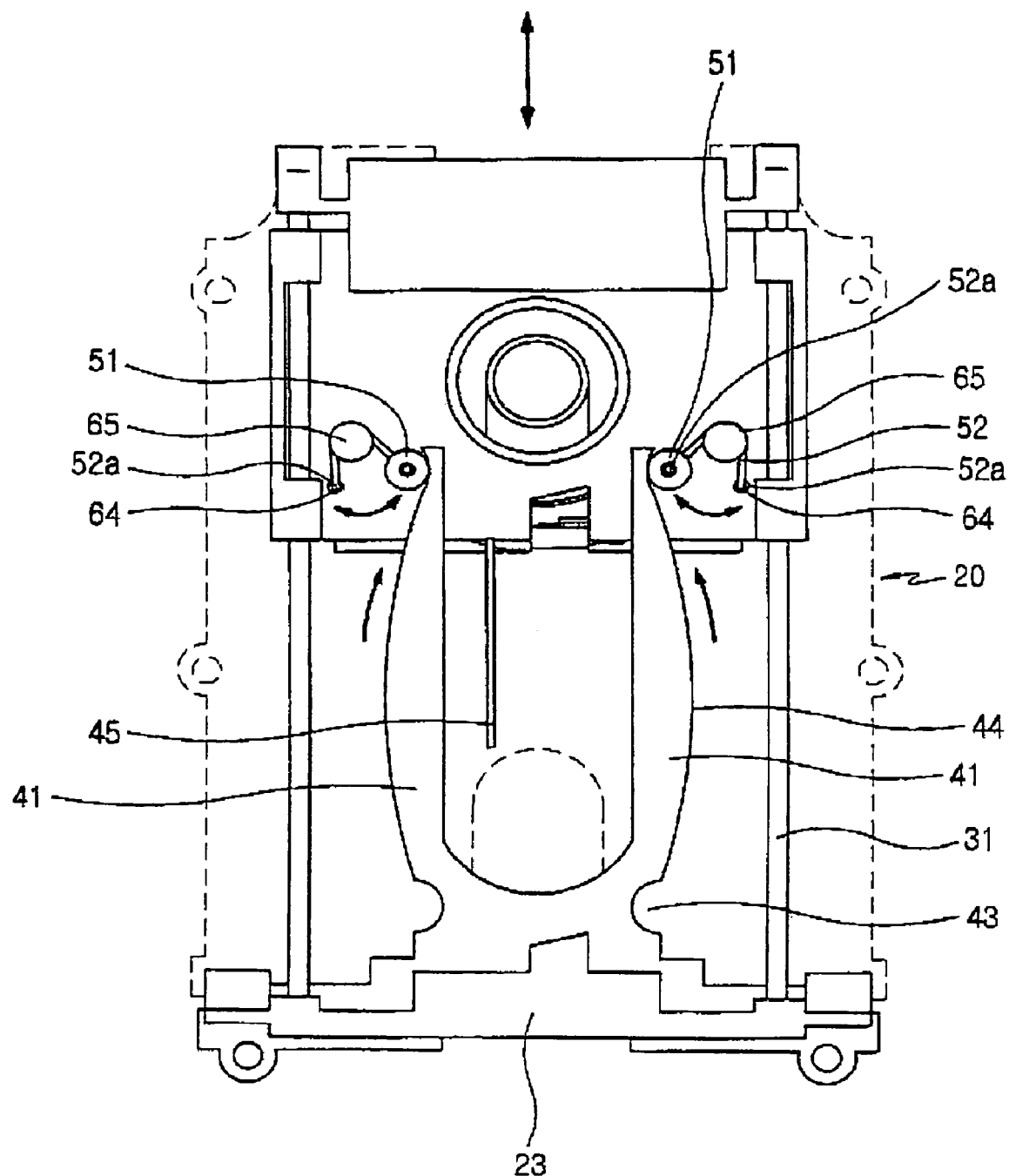
FIG. 7 is a top view illustrating a sliding swing apparatus, prior to a sliding movement, according to a preferred embodiment of the present invention.
Figure 15:
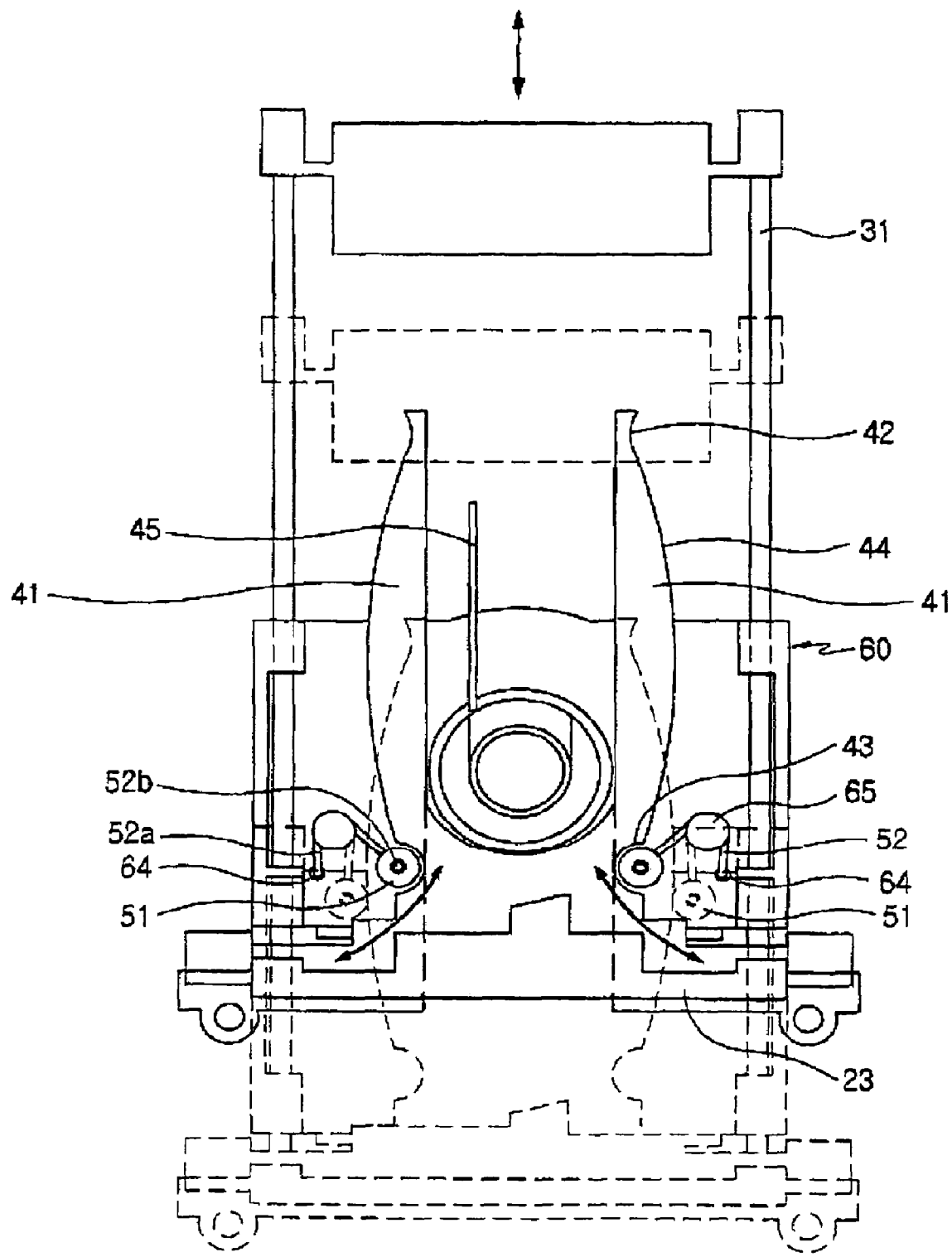
FIG. 15 is a top view illustrating a sliding movement means, during actuation, of a sliding swing apparatus according to a preferred embodiment of the present invention.

As shown in FIGS. 7 and 15, the sliding member 20 has the guide rail 41 formed on the interior thereof to guide the sliding movement of the sliding member 20, and at least one rolling member 51 rolls and travels along the guide rail.

The rolling member 51 is then released from the first stop groove 42 formed on an end of the guide rail 41.

The first stop groove 42 determines the initial position of the sliding member 20.

After being released from the first stop groove 42 as shown in FIG. 15, the rolling member 51 travels along the guide slant surface 44 which is curved in a direction perpendicular to the sliding direction.

The rolling member 51 is coupled to the free end 52b of the torsion spring 52 and rolls. The fixation end 52a of the torsion spring 52 is coupled to the fixation hole 64 of the swing member 60.

As the rolling member 51 travels along the guide slant surface 44 as shown in FIG. 15, the free end 52b of the spring rotates along a predetermined trajectory.

The center portion of the torsion spring 52 is fixed to the spring fixation portion 65, which is formed on the swing member 60, to provide an elastic force so that the free end 52b can rotate along a predetermined trajectory.

Figure 11:
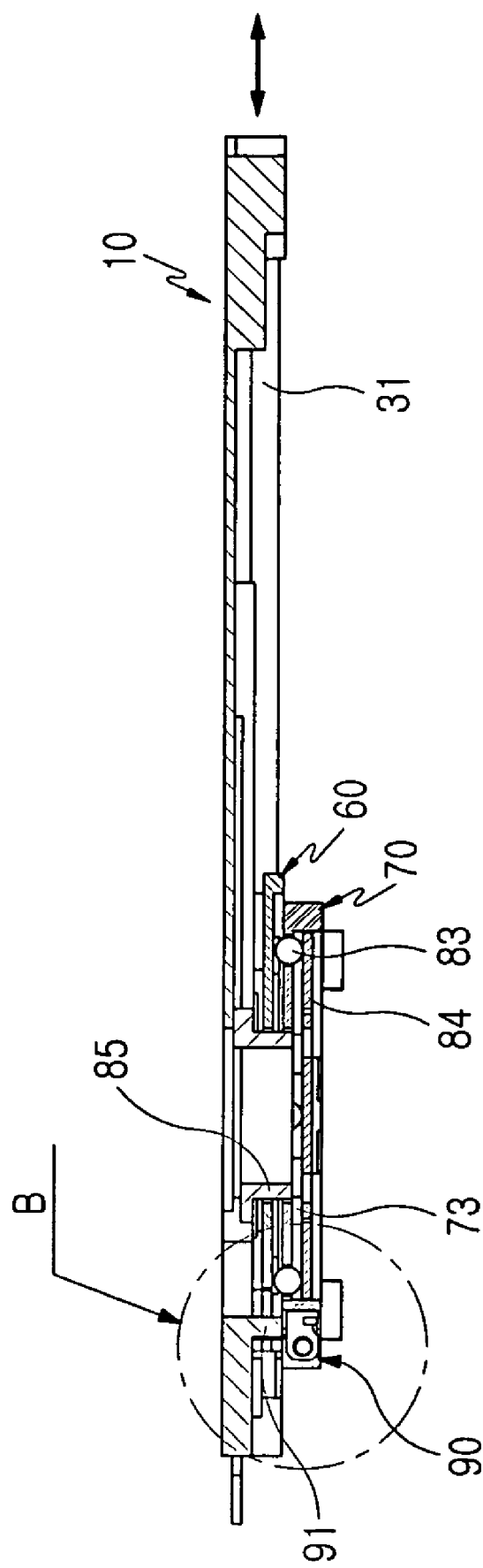
FIG. 11 is a lateral sectional view illustrating a sliding swing apparatus, after a sliding movement, according to a preferred embodiment of the present invention.
Figure 12:
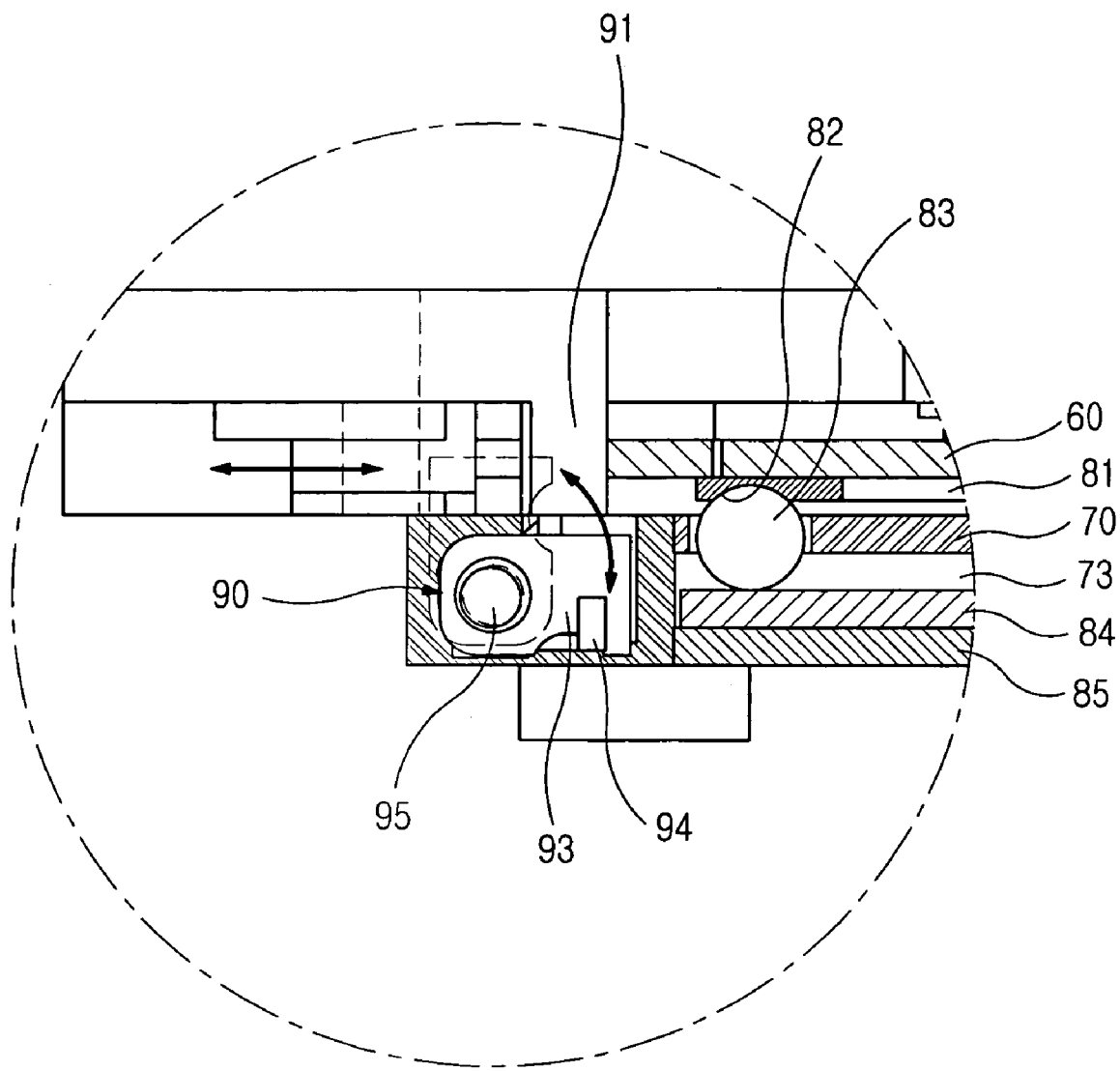
FIG. 12 is a lateral sectional view magnifying part B of FIG. 11.

If the sliding member 20 reaches the final position of the sliding movement as shown in FIGS. 11 and 12, the locker portion 91 formed on the support rib 23 of the sliding member 20 is inserted into the locker groove 92 formed on a lateral surface of the swing member 60 and the fixation member 70.

The locker groove 92 has the rotation locker 93 positioned therein to cause the swing member 60 and the fixation member 70 to disengage from each other as shown in FIGS. 13 and 14. As the locker portion 91 is inserted into the locker groove 92 and contacts the rotation locker 93, the rotation locker 93 rotates about the locker hinge axis A1.

The rotation locker 93 is fastened to the fixation member 70 by the locker pin 95 to allow rotation about the locker hinge axis A1.

As shown in FIGS. 17 and 18, the rotation locker 93 causes the swing member 60 and the fixation member 70 to disengage from each other.

The swing member 60 then rotates as shown in FIGS. 21 and 22.

The sliding member 20 rotates with the swing member 20 as shown in FIG. 17.

The fixation member 70 has the locker guide groove 74 formed on the upper surface thereof, which is adapted to guide the locker portion 91 when the swing member 60 rotates as the rotation locker 93 is rotated by the locker portion 91, as shown in FIGS. 21 and 22. As such, the locker portion 91 rotates along the locker guide groove 74.

The locker guide groove 74 has the first and second stopper portions 74a and 74b respectively formed on both ends thereof, which are adapted to contact the latching step 63 of the swing member 60 and to limit the rotation of the swing member 60. As the latching step 63 rotates, it contacts the second stopper portion 74b of the locker guide groove 74 and stops rotating.

If the sliding member 20 and the swing member 60 rotate in the opposite direction, the latching step 63 contacts the first stopper portion 74a. The members 20 and 60 then stop rotating and return to their original positions.

If the sliding member 20 is slid in the opposite direction by the first and second guide means 30 and 40, the locker portion 91 is released from the locker groove 92 and the rotation locker 93 returns to its original position by the elastic force from the pin spring 94.

An end of the pin spring 94 is fixed to the fixation member 70, with its other end coupled to the rotation locker 93. The center portion of the spring extends in axial alignment with the locker pin 95 and is coupled thereto. As the locker portion 91 is released from the locker groove 92, the rotation locker 93 is rotated by the elastic force from the pin spring 94.

As mentioned above, the sliding swing apparatus according to the present invention makes it possible to conveniently watch the displayed screen in a TV or video watching mode. In addition, it is possible to prevent the sliding swing housing from sliding during swing motion by locking the terminal on its fully extended configuration. The apparatus is also very compact.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A sliding swing apparatus of a portable telephone apparatus having a main body and a sliding housing adapted to be opened and closed through sliding and swing motions while facing the main body, the sliding swing apparatus comprising:
    a sliding member adapted to slide along a longitudinal direction and to rotate;
    first and second guide means positioned on the sliding member to guide the sliding movement of the sliding member;
    a sliding movement means positioned between the sliding member and the guide means to enable the sliding member to slide from initial to final positions;
    a swing member adapted to be coupled to the sliding member by the guide means for a sliding movement and to rotate together with the sliding member only after the sliding movement is over;

a third guide means coupled to flue swing member to guide the rotation of the sliding member and the swing member;

a rotation means positioned on the third guide means to enable the swing member to rotate; and a swing locking apparatus adapted to cause the swing member and the third guide means to engage with each other and stop rotating, during a linear sliding movement together with the sliding member, and to cause the swing member to disengage from the third guide means to be able to rotate, when the sliding movement is over.

2. A sliding swing apparatus of a portable telephone apparatus as claimed in claim 1, wherein the first guide means comprises:

a pair of guide rods respectively fixed to both lateral surfaces of the sliding member and coupled to the swing member in such a manner that the sliding member can slide along the longitudinal direction; and, a pair of fastening portions respectively positioned on both ends of the swing member while extending along the pair of guide rods to be coupled thereto for sliding.

3. A sliding swing apparatus of a portable telephone apparatus as claimed in claim 1, wherein the sliding member has:

a member-side fastening portion formed thereon to be fastened and fixed to the sliding housing;

a pair of first fixation holes formed on an end thereof to be coupled and fixed to an end of at least one guide rod fixed to the sliding member and;

a support rib fastened to the other end thereof, which has a pair of second fixation holes formed thereon to be coupled to the other end of the guide rod.

4. A sliding swing apparatus of a portable telephone apparatus as claimed in claim 1, wherein the second guide means comprises:

a guide rail formed on the interior of the sliding member to enable it to slide;

a first stop groove formed on an end of the guide rail to determine the initial position of the sliding member;

a second stop groove formed on the other end of the guide rail to determine the final position of the sliding member; and a guide slant surface curved in a direction perpendicular to the sliding direction near the center between the first and second stop grooves.

5. A sliding swing apparatus of a portable telephone apparatus as claimed in claim 1, wherein the swing member has:

a reception space recessed from the upper surface thereof to incorporate the sliding movement means;

a through-hole formed at the center thereof so that a flexible circuit can pass through; and, at least one latching step formed on the lower surface thereof to limit rotation of the swing member.

6. A sliding swing apparatus of a portable telephone apparatus as claimed in claim 1, wherein the sliding movement means comprises:

at least one rolling member positioned between the sliding member and the swing member, the rolling member adapted to roll and slide while continuously being forced against a guide slant surface of the second guide means; and, an elastic means coupled to the rolling member to provide an elastic force which forces the rolling member against the guide slant surface.

7. A sliding swing apparatus of a portable telephone apparatus as claimed in claim 6, wherein the elastic means is made up of a torsion spring, which has a fixation end formed on an end thereof to be coupled and fixed to a fixation hole formed on the swing member and a free end formed on the other end thereof to be coupled to the rolling member and to be guided along the guide slant surface, the center portion of the torsion spring being fixed to a spring fixation portion formed on the swing member to rotate the free end along a predetermined trajectory according to the sliding movement.

8. A sliding swing apparatus of a portable telephone apparatus as claimed in claim 1, wherein:

the third guide means is made up of a fixation member to be fastened to the main body;

the fixation member has a member-side through-hole formed at the center thereof so that a flexible circuit can pass through;

at least one bail hole is formed about the member-side through-hole with an equiangular spacing along the circumferential direction so that a corresponding ball can be seated therein; and, a reception groove is recessed from the lower surface of the fixation member to receive the rotation means therein.

9. A sliding swing apparatus of a portable telephone apparatus as claimed in claim 1, wherein the rotation means comprises:

a ball washer positioned on the lower surface of the swing member;

at least one ball groove formed on the upper surface of the ball washer with an equiangular spacing so that a corresponding ball can be seated therein;

at least one ball seated in and forced against the ball groove and adapted to rotate while organically engaging the ball groove as the swing member rotates; and a spring member for providing an elastic force to push the ball.

10. A sliding swing apparatus of a portable telephone apparatus as claimed in claim 9, wherein the spring member has a spring cover positioned on the lower surface thereof 11. A sliding swing apparatus of a portable telephone apparatus as claimed in claim 1, wherein:

the sliding member has a swing shaft positioned on the lower surface thereof and adapted to slide along the second guide means;

the swing shaft extends through the swing member while being rotatably fastened thereto and is fastened to the rotation means and the third guide means; and, the swing shaft has at least one screw fastening portion formed thereon with an equiangular spacing for screw fastening after the swing member, the rotation means, the third guide means, and a spring cover are successively fastened.

12. A sliding swing apparatus of a portable telephone apparatus as claimed in claim 1, wherein the second guide means has a guide protrusion formed on its interior thereof to guide the sliding movement of a swing shaft positioned on the lower surface of the sliding member.

13. A sliding swing apparatus of a portable telephone apparatus as claimed in claim 11, wherein the second guide means has a guide protrusion formed on its interior thereof to guide the sliding movement of the swing shaft.

14. A sliding swing apparatus of a potable telephone apparatus as claimed in claim 1, wherein the sliding member, the first, second, and third guide means, the sliding movement means, the swing member, and the rotation means are made of a metallic material.

15. A sliding swing apparatus of a portable telephone apparatus as claimed in claim 1, further comprising a swing locking portion, the swing locking portion having:

a locker portion formed on a support rib which is fastened to the sliding member;

a locker groove Coned on a lateral surface of the swing member and the third guide means to insert or release the locker portion according to the sliding movement;

a rotation locker positioned in the locker groove arid adapted to limit the rotation by causing the swing member and the third guide means to engage with each other, during an early stage of the sliding movement, the rotation locker also being adapted to contact the locker portion as it is inserted into the locker groove when the sliding is over and to rotate the locker portion about a locker hinge axis so that the swing member and the third guide means disengage from each other and the swing member can rotate; and an elastic means for providing an elastic force to enable the rotation locker to rotate in the locker groove.

16. A sliding swing apparatus of a portable telephone apparatus as claimed in claim 1, wherein the third guide means has a locker guide groove formed on the upper surface thereof to guide a locker portion formed on a support rib fastened to the sliding member when the swing member rotates as the locker portion is rotated by a rotation locker positioned in a locker groove formed on a lateral surface of the swing member.

17. A sliding swing apparatus of a portable telephone apparatus as claimed in claim 16, wherein the locker guide groove has first and second stopper portions respectively formed on both ends thereof, which are adapted to contact a latching step of the swing member and to limit the rotation of the swing member.

18. A sliding swing apparatus of a portable telephone apparatus as claimed in claim 15, wherein the rotation locker has a locker pin extending through it while being coupled thereto, which provides the locker hinge axis and which is adapted to rotate about the hinge axis.

19. A sliding swing apparatus of a portable telephone apparatus as claimed in claim 15, wherein the elastic means is made up of a pin spring, an end of which is fixed to the third guide means and the other end is fixed to the rotation locker, and the center portion of the pin spring extends in axial alignment with a locker pin extending through the rotation locker, and is coupled thereto.

20. A sliding swing apparatus of a portable telephone apparatus having a main body and a sliding housing adapted to be opened and closed through sliding and swing motions while facing the main body, the sliding swing apparatus comprising:

a sliding member adapted to slide along a longitudinal direction and to rotate;

a guide means for guiding sliding movement and rotation of the sliding member;

a sliding movement means positioned between the sliding member and the guide means to enable the sliding member to slide from initial to final positions;

a swing member adapted to be coupled to the sliding member by the guide means for a linear sliding movement and to rotate together with the sliding member only after the sliding movement is fully extended;

a rotation means positioned on the guide means to enable the swing member to rotate; and a swing locking a apparatus adapted to cause the swing member and third guide means to engage with each other and stop rotating, during a linear sliding movement together with the sliding member, and to cause the swing member to disengage from the third guide means to be able to rotate, when the sliding movement is over.

21. A sliding swing apparatus of a portable telephone apparatus as claimed in claim 20, wherein the guide means comprises:

first and second guide means for guiding the sliding movement of the sliding member; and, the third guide means for guiding the rotation of the sliding member and the swing member.

22. A sliding swing apparatus of a portable telephone apparatus as claimed in claim 21, wherein the first guide means comprises:

a pair of guide rods respectively fixed to both lateral surfaces of the sliding member and coupled to the swing member in such a manner that the sliding member can slide along the longitudinal direction; and, a pair of fastening portions respectively positioned on both ends of the swing member while extending along the pair of guide rods to be coupled thereto for sliding.

23. A sliding swing apparatus of a portable telephone apparatus as claimed in claim 21, wherein the second guide means comprises:

a guide rail formed on the interior of the sliding member to enable a sliding motion of the sliding member;

a first stop groove formed on an end of the guide rail to determine the initial position of the sliding member;

a second stop groove formed on the other end of the guide rail to determine the final position of the sliding member; and a guide slant surface curved in a direction perpendicular to the sliding direction near the center between the first and second stop grooves.

24. A sliding swing apparatus of a portable telephone apparatus as claimed in claim 21, wherein:

the third guide means is made tip of a fixation member to be fastened to the main body;

the swing member has a member-side through-hole formed at the center thereof;

the member-side through-hole has at least one ball hole formed about it with an equiangular spacing along the circumferential direction so that a corresponding ball can be seated therein; and, the fixation member has a reception groove recessed from the lower surface to receive the rotation means therein.

25. A sliding swing apparatus of a portable telephone apparatus having a main body and a sliding housing adapted to be opened and closed through sliding and swing motions while facing the main body, the sliding swing apparatus comprising:

a sliding member adapted to slide along the longitudinal direction and to rotate by means of a guide;

a swing member adapted to be coupled to the sliding member by the guide for a linear sliding movement and to rotate together with die sliding member only after the sliding movement is fully extended;

a sliding movement/rotation means for enabling the sliding member to slide from initial to final positions and enabling the members to rotate in the final position; and a swing locking apparatus adapted to cause the swing member and a guide means to engage with each other and stop rotating, during a linear sliding movement together with the sliding member, and to cause the swing member to disengage from the guide means to be able to rotate, when the sliding movement is over.

* * * * *